United States Patent [19]

Smith

[11] Patent Number: 5,216,750

[45] Date of Patent: Jun. 1, 1993

[54] COMPUTATION SYSTEM AND METHOD USING HAMMING DISTANCE

[75] Inventor: Derek J. Smith, Dallas, Tex.

[73] Assignee: Texas Instruments Incorporated, Dallas, Tex.

[21] Appl. No.: 662,041

[22] Filed: Feb. 28, 1991

Related U.S. Application Data

[63] Continuation of Ser. No. 534,792, Jun. 7, 1990, abandoned.

[51] Int. Cl.⁵ ................................. G06F 15/18
[52] U.S. Cl. .......................... 395/24; 395/27; 382/15
[58] Field of Search ............. 364/513; 382/14, 15; 395/24, 27

[56] References Cited

U.S. PATENT DOCUMENTS 4,945,494  7/1990  Penz et al. ..................... 364/513

*Primary Examiner*—Allen R. MacDonald
*Attorney, Agent, or Firm*—Ira S. Matsil; James C. Kesterson; Richard L. Donaldson

[57] ABSTRACT

Preferred embodiments include systems with neural network processors (58) having input encoders (56) that encode integers as binary vectors so that close integers encode as close binary vectors by requiring adjacent integers have encoded binary vectors that differ in a fixed fraction of their bits.

11 Claims, 1 Drawing Sheet

COMPUTATION SYSTEM AND METHOD USING HAMMING DISTANCE

This is a continuation of application Ser. No. 07/534,792, filed Jun. 7, 1990 now Abandoned.

CROSS-REFERENCE TO RELATED APPLICATIONS

Copending U.S. application Ser. Nos. 032,887, filed Mar. 31, 1987 (Penz) now abandoned 318,038, filed Mar. 2, 1989 (Penz et al), 057,887, now U.S. Pat. No. 4,885,757 filed Mar. 3, 1987 (Provence), 010,619, filed Feb. 4, 1987 (Frazier), now abandoned, filed of even date (Frazier), disclose related subject matter. All of these cross-referenced applications are assigned to the assignee of this application.

BACKGROUND OF THE INVENTION

1. Field of the Invention

The present invention relates to computation systems, and, more particularly, to input encoders for neural network and related distributed memory and computation devices.

2. Description of the Related Art

Attempts to understand the functioning of the human brain have led to various "neural network" models in which large numbers of neurons are interconnected. These models roughly presume each neuron exists in one of two states (quiescent and firing) with the state determined by the states of connected nuerons (if enough connected neurons are firing, then the original neuron should be in the firing state); and the thrust of the models is to perform computations such as pattern recognition with the neural networks.

J. Hopfield, Neural Networks and Physical Systems with Emergent Collective Computational Abilities, 79 Proc. Natl. Acad. Sci. USA 2554 (1982) describes a neural network model with N neurons each of which has the value 0 or 1 (corresponding to quiescent and to firing), so the state of the network is then a N-component vector $V = [V_1, V_2, \ldots, V_N]$ of 0's and 1's which depends upon time. The neuron interconnections are described by a matrix $T_{i,j}$ defining the influence of the $j^{th}$ neuron on the $i^{th}$ neuron. The state of the network evolves in time as follows: for each i the $i^{th}$ neuron has a fixed threshold $\theta_i$ and readjusts its state $V_i$ randomly in time by setting $V_i$ equal to 0 or 1 depending on whether $$\sum_j T_{i,j} V_j - \theta_i$$

is negative or positive. All neurons have the same average rate of readjustment, and the readjustments define a dynamical flow in state space.

With the assumption that $T_{i,j}$ is symmetric, the potential function $$\sum_i \sum_j T_{i,j} V_i V_j$$

can be used to show that the flow of the network is to local minima of the potential function. Further, with a given set of uncorrelated N-component vectors $U^1, U^2, \ldots, U^s$, a $T_{i,j}$ can be defined by $$T_{i,j} = \sum_{1 < k < s} (2U_i^k - 1)(2U_j^k - 1)$$

and with the thresholds equal to 0, these $U^k$ are the fixed points of the flow and thus stable states of the network. Such a network can act as a content-addressable memory as follows: the memories to be stored in the network are used to construct the $U^k$ and hence $T_{i,j}$, so the stored memories are fixed points of the flow. Then a given partial memory is input by using it to define the initial state of the network, and the state will flow usually to the closest fixed point/stable state $U^k$ which is then the memory recalled upon input of the partial memory.

Further analysis and modified network models appear in, for example, J. Hopfield et al, Computing with Neural Circuits: A Model, 233 Science 625 (1986) and J. Hopfield, Neurons with Graded Response Have Collective Computational Properties like Those of Two-State Neurons, 81 Proc. Natl. Acad. Sci. USA 3088 (1984).

D. Ackley et al, A Learning Algorithm for Boltzmann Machines, 9 Cognitive Science 147 (1985) describe neural networks with additional adjustment mechanisms for the neurons which analogize thermal fluctuations; this permits escape from local minima of the potential function. However, this disrupts the flow to fixed points for memory recall of the Hopfield type neural networks.

L. Cooper, A Possible Organization of Animal Memory and Learning, Proc. Nobel Symp. Coll. Prop. Phys. Sys. 252 (Academic, N.Y. 1973) observes that the modelling of neural networks for animal memory and learning has the problem of mapping events in the animal's environment (i.e., sensory output) to signal distributions in the animal's neurons with the fundamental property of preserving closeness or separateness (in some sense not yet completely defined) of the events. That is, with a vector representation of the neural network states, two events as similar as a white cat and a gray cat should map into vectors which are close to parallel while two events as different as the sound of a bell and the sight of food should map into vectors that are close to orthogonal. Note that standard analysis, such as described in Gonzalez and Wintz, Digital Image Processing (Addison-Wesley 1977), does not use neural network computation and does not have this problem; rather, the standard analysis attempts to extract features and categorize by serial number crunching.

Attempts to encode data while preserving closeness include methods such as the thermometer code which maps an integer k to a vector with k leading 1's followed by n-k 0's. This severely limits the capacity of the neural network and usually requires data compression or resolution loss.

Thus the problem of encoding sensor output for neural network input to preserve some sense of closeness is not solved in the known neural networks except in the extreme cases of codes such as the thermometer code that have limited capacity. SUMMARY OF THE INVENTION The present invention provides encoders and neural network computers in which neural network compatible code vectors are generated recursively by changing random vector components to yield a sequence of code vectors for encoding by a map of a range of inputs to the sequence of code vectors. This encoding preserves closeness of the inputs in terms of Hamming type distance between the image vectors by mapping close inputs to vectors nearby in the sequence. Further, in contrast to closeness preserving codes such as the thermometer code, the inventive encoding provides a large capacity for the neural network. Preferred embodiments include use of neural networks with neurons having only two states, binary vectors, and integer inputs so that the mapping of a range of integers to the sequence of binary vectors is simply indexing.

This encoder solves the problem of preserving closeness for encoding sensor output to nerual network compatible input while retaining a large capacity to avoid data compression or resolution loss.

BRIEF DESCRIPTION OF THE DRAWINGS

The drawings are schematic for clarity.

DESCRIPTION OF THE PREFERRED EMBODIMENTS

Figure 1:
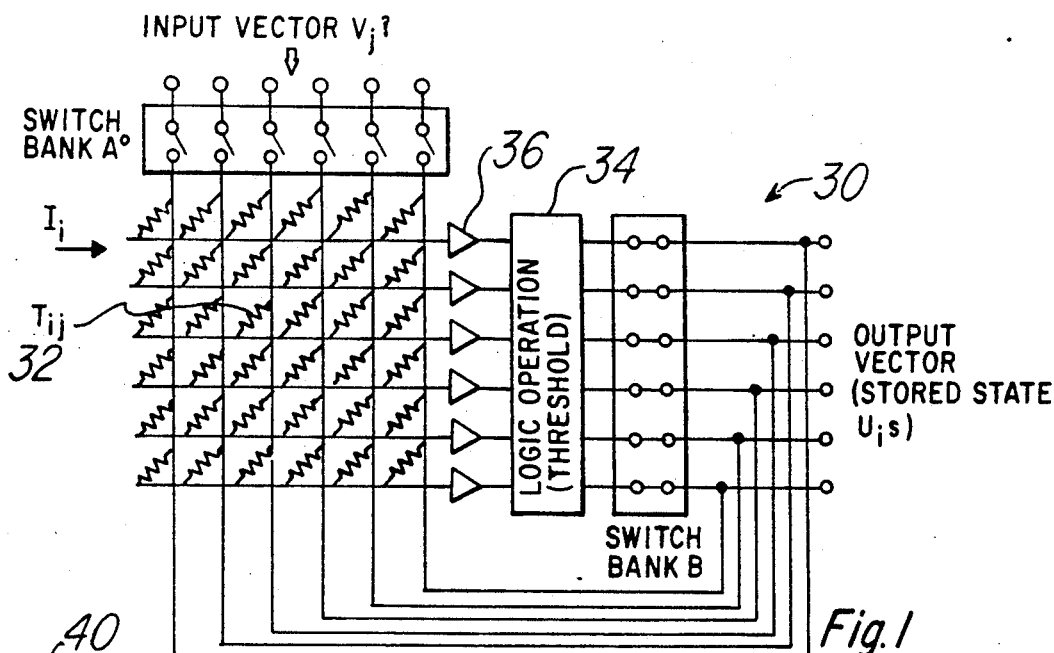
FIG. 1 illustrates a possible electronic hardware implementation of a neural network.

The preferred embodiments are best described in the context of a specific neural network model. So consider a two-state threshold model of N neurons connected in a network, and presume each of N neurons has two states: the output of the $j^{th}$ neuron is denoted $V_j$ and may only have the value 0 or 1. The $j^{th}$ neuron's output is connected to the $i^{th}$ neuron's input with a synaptic interconnection strength $T_{i,j}$, and the $i^{th}$ neuron may also have an external input $I_i$. Thus for each i the total input to the $i^{th}$ neuron is given by:

$$\sum_{1 \leq j \leq N} T_{i,j} V_j + I_i$$

Note that the term $T_{i,i}$ represents a self-stimulation of the $i^{th}$ neuron and that $T_{i,i}=0$ is traditionally presumed; however, this is not necessary in the following. For expositional simplicity, T will be presumed symmetric: $T_{i,j}=T_{j,i}$, although this does not affect the preferred embodiments.

Each of the N neurons is presumed to respond at random times to its then-current total input and adjust its output as follows:

$$V_i \rightarrow 0 \text{ if } \sum_j T_{i,j} V_j + I_i < \theta_i$$

$$V_i \rightarrow 1 \text{ if } \sum_j T_{i,j} V_j + I_i > \theta_i$$

where $\theta_i$ is a threshold for the $i^{th}$ neuron. These repeated responses of the outputs to the then-current inputs constitutes the dynamical evolution of the network of neurons and may be described as a flow in a state space. More specifically, define a state of the network at time t as an N-component vector V with its $i^{th}$ component equal to the output of the $i^{th}$ neuron ($V_i$) at time t. In other words, V is a vector of 0's and 1's. (The dependence of V on t is suppressed for clarity.) Thus the state space is isomorphic to the vertices of a unit hypercube in N-dimensional euclidean space, and each dynamical change of a $V_i$ translates into a change from the state corresponding to one vertex to the state corresponding to a second vertex connected by an edge to the first vertex.

The dynamical flow can be described by a potential (Liapunov) function as follows: define $$E(V) = -\frac{1}{2} \sum_{i,j} T_{i,j} V_i V_j - \sum_j V_j(I_j - \theta_j)$$

Note that the time dependence of V has been suppressed. A change in a component of V, say $V_k$, is denoted by $\Delta V_k$ and implies a change in E equal to $$\Delta E(V) = -\left(\sum_j T_{k,j} V_j + I_k - \theta_k\right) \Delta V_k.$$

$V_k$ can only change from 0 to 1 or from 1 to 0, so $\Delta V_k$ is either $+1$ or $-1$, and the rule for $V_k$ changes implies that $\Delta E$ is always negative because the term in the parentheses is negative for $V_k$ changing from 1 to 0 and positive for $V_k$ changing from 0 to 1. Thus E is monotonically decreasing during the dynamical flow, and the fixed points are states that are local minima of E. Of course, the state space is discrete and finite, so the dynamical flow is a finite sequence of jumps.

The neural network behaves as an associative memory when the dynamical flow in state space has fixed points which attract nearby states. As illustrated by example in the following, a fixed point corresponds to a particular memory stored in the network, and nearby states contain partial information about that memory; so initializing the network (inputting initial values for the neurons) at a state nearby a particular fixed point state will recall the memory corresponding to that fixed point state by the dynamical flow. For example, if $U^1$, $U^2, \ldots, U^s$ are binary N-dimensional vectors which are fixed points for the dynamical flow and correspond to stored memories of images 1, 2, ..., s, and if V is an N-dimensional vector corresponding to an observed image, then inputting V to be the initial state of the network and letting the network dynamically evolve will result in the state of the network becoming fixed at a certain $U^k$ which is the "closest" of the fixed points to V; and image k has been recalled by the network upon input of the observed image. Note that "close" in the state space is typically measured by Hamming distance: if V and W are two N-dimensional vectors of 0's and 1's, then the Hamming distance from V to W is K where V and W have K components not equal and the remaining N-K components equal.

The interconnection strengths $T_{i,j}$ determine the fixed points in state space, and a possible recipe for defining $T_{i,j}$ to store a given set of memories is as follows: if states $U^1, U^2, \ldots, U^s$ are to be stored (so each $U^k$ is an N-dimensional vector of 0's and 1's), then set $$T_{i,j} = \sum_{1 \leq k \leq s} U_i^k U_j^k$$

This definition of $T_{i,j}$ implies the $U^k$ are the fixed points if the $U^k$ are uncorrelated.

FIG. 1 schematically illustrates a possible neural network fabricated from standard electronic components.

The network, generally denoted by the reference numeral 30, includes rows and columns of wires interconnected by an array of transconductances $T_{i,j}$ 32, the horizontal wires connect to buffers 36 and threshold linear array 34 and switch bank B. The neuron states correspond to voltages on the vertical wires and the connecting righthand portions of the horizontal wires. Switch bank A (with switch bank B open) is used to input the initial network state, and the buffers 36 may incorporate the random adjustment timing. If input $I_i$ are needed, they are entered at the lefthand ends of the horizontal wires. Of course, more complicated neural networks could have neurons that are neither directly connected to the inputs nor to the outputs ("hidden units") and could have built-in transconductance variation mechanisms.

Figure 2:
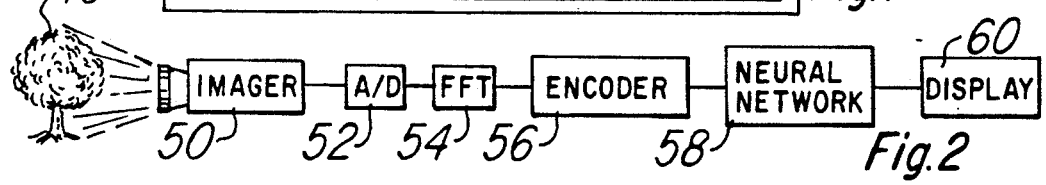
FIG. 2 illustrates a first preferred embodiment image recognizer.

FIG. 2 illustrates in schematic block form first preferred embodiment image recognizer: Imager 50 (such as a CCD TV camera) views image 40 and outputs a sequence of real numbers corresponding to pixel intensities in raster scanned format; the real numbers are quantized by analog-to-digital converter 52; a discrete Fourier transform is performed (frame-by-frame if a series of images are being considered) by Fast Fourier Transform hardware (or software) 54 which outputs a sequence of (complex) integers corresponding to transform pixel intensities in raster scanned format. Then the integers are encoded as binary numbers by first preferred embodiment encoder 56 to be compatible with the binary nature of the neurons of neural network 58. The binary numbers are used as the input state $V = [V_1, V_2, \ldots, V_N]$ to neural network 58. The interconnection strength matrix $T_{i,j}$ for neural network 58 could have been formed by the previously described method of setting:

$$T_{i,j} = \sum_{1 \leq k \leq s} U_i^k U_j^k$$

where $U^1, U^2, \ldots, U^3$ are the uncorrelated binary encoded discrete Fourier transformed image information for a stored set of s images. Then the dynamics of neural network 58 will flow from the input state V to one of the fixed point states, say $U^m$, and the stored image corresponding to $U^m$ will be the image recognized by neural network 58 given the input image 52; the neural network state is observed (after inverse FFT) on display 60.

A numerical illustration shows the problem of the conversion of the essentially real number output of sensors (TV camera) to binary form encoding for input to the neural network and dynamical flow computation. In particular, consider a greatly simplified network with $N=5$, no inputs $I_i$, thresholds $\theta_i$ all equal to $\frac{1}{2}$ and $T_{i,j}$ formed by storing $U^1 = [0,0,0,0,1]$ and $U^2 = [1,0,0,0,0]$; thus $$T = \begin{bmatrix} 1 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 1 \end{bmatrix}.$$

$U^1$ is a fixed point because $\Sigma_j T_{i,j} U_j^1$ equals 1 for $i=5$ and 0 for all other i; thus the thresholds $\theta_i$ make $U_5^1 = 1$ and the remaining components 0 which means no changes. Similarly, $U^2$ is a fixed point.

Then input $V = [1,1,1,1,0]$ as the initial state of the network. V is not a fixed point: $\Sigma_j T_{i,j} V_j$ equals 1 for $i=1$ and equals 0 for all other i. Thus $V_i$ should change from 1 to 0 for i equal to one of 2, 3, or 4. After this change, the computation of the new sum shows that one of the two unchanged such $V_j$s should change 1 to 0; and after this change, the computation shows that the last unchanged such $V_i$ should change 1 to 0, and the fixed point $U^2$ has been reached by the dynamical flow.

This flow from V to $U^2$ is expected because the Hamming distance (in state space) between V and $U^1$ is 5 and the Hamming distance between V and $U^2$ is 2, so V appears "closer" to $U^2$ than to $U^1$. However, if V, $U^1$, and $U^2$ were obtained by the binary expression of integers, then V derived from 15, $U^1$ from 16, and $U^2$ from 1. Thus V and $U^1$ were very close as integers before conversion to binary, and V and $U^2$ were very far apart; this is just the opposite of the closeness of the binary vectors. This illustrates the problem of disruption of the closeness of numbers upon conversion to neural network compatible binary form.

First preferred embodiment encoder (corresponding to encoder 56 of FIG. 2) and encoding method are as follows. Presume input integers which fall in the range of 1 to 1,000 are to be encoded as 100-bit binary vectors. First a sequence of 1,000 100-bit binary vectors is constructed, and then the input integer range is associated with the sequence of 100-bit vectors to form a lookup table for encoding input integers.

The first preferred embodiment method constructs a sequence of vectors, $V^1, V^2, V^3, \ldots, V^{1,000}$ recursively:

(a) Pick a random 100-bit binary vector and call it $V^1 = (V_1^1, V_2^1, V_3^1, \ldots, V_{100}^1)$. This is the starting vector. As an alternative, a preset starting vector could be used: for example, all components equal to zero or all equal to one or alternating zeros and ones or any other such preset vector.

(b) For $k=1, 2, \ldots, 999$, derive $V^{k+1}$ from $V^k$ as follows: Pick 10 random bits of $V^k$ and flip them; that is, if $j_1, j_2, \ldots, j_{10}$ are the labels of the 10 random bits picked and if $V_{j1}^k$ equals 0, then it is changed to 1 (and if it equals 1, then it is changed to 0), and similarly for $V_{j2}^k, \ldots, V_{j10}^k$. Note that two or more of the $j_1, j_2, \ldots, j_{10}$ may coincide, and in this case the corresponding bit(s) will be flipped two or more times. Call the resulting binary vector $V^{k+1}$. In other words, $V_i^{k+1} = V_i^k$ if $i \neq j_1, j_2, \ldots, j_{10}$ and $V_i^{k+1} \neq V_i^k$ if $i = j_1, j_2, \ldots, j_{10}$ except for coincidence(s) of an even number of the $j_1, j_2, \ldots, j_{10}$.

Then the first preferred embodiment encoder maps the range of input integers, 1 to 1,000, to the vectors $V^1, V^2, \ldots, V^{1,000}$ simply by mapping integer k to vector $V^k$. This establishes a lookup table for encoding integers in the range, and the first preferred embodiment encoder is a lookup table with the characteristic that adjacent binary vectors in the table are necessarily Hamming close (distance of at most 10).

Note that the input range 1 to 1,000 could easily be shifted and expanded or contracted with a corresponding expansion or contraction of the sequence of vectors; also the mapping of integers to vectors could be many-to-one, although this would forfeit resolution.

The first preferred embodiment may be called a "scatter code" because the sequence of vectors $V^j$ is scattered about the unit hypercube. Also, the first preferred embodiment encoding is expected to preserve closeness for small distances. In particular, if two integers k and k+j are a distance j apart, then the expected Hamming distance between the two image vectors $V^k$ and $V^{k+j}$ is given by $$50 \times \left(1 - \left(1 - \frac{1}{50}\right)^{10j}\right)$$

This translates into the following numerically:

| Integer distance | Expected Hamming distance |
|---|---|
| 0 | 0 |
| 1 | 9 |
| 2 | 17 |
| 3 | 23 |
| 4 | 28 |
| 5 | 35 |
| 6 | 35 |
| 7 | 38 |
| 8 | 40 |
| 9 | 42 |
| 10 | 43 |

Note that the expected Hamming distance asymptotically approaches 50 as the integer distance increases and that the preservation of closeness only holds for small distances. The asymptotic behavior just reflects the fact that multiple flippings of each of the bits leads to uncorrelated vectors, and two uncorrelated 100-bit binary vectors will have about 50 bits matching and 50 bits not matching; that is, separation by a Hamming distance of 50.

Figure 3:
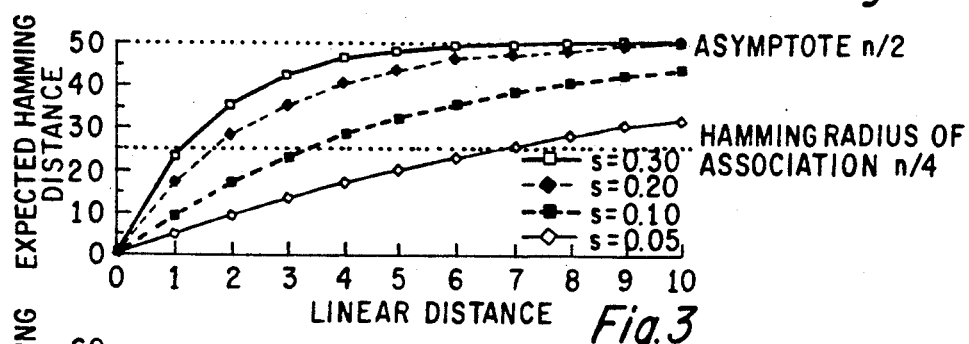
FIG. 3 shows closeness preservation in the first and second preferred embodiment encodings.

Two input integers may be considered close together if the linear distance between them is less than a prescribed radius of association. Correspondingly, two binary vectors may be considered close together if their Hamming distance separation is less than a prescribed radius of association. An often used measure of closeness of binary vectors is n/4 for n-bit vectors. Thus for the first preferred embodiment such Hamming distance radius of association would be 25 and this would translate into an integer linear distance of 3 to 4. This radius can be adjusted as described in connection with the second preferred embodiment as illustrated in FIG. 3. Indeed, the second preferred embodiment differs from the first preferred embodiment by choosing a different fraction of the bits to flip at each step in the vector sequence generation. That is, if s equals the fraction of bits flipped at each step, then for the first preferred embodiment s=0.10. The second preferred embodiment may have other values of s, and the closeness preservation for various values of s appear in FIG. 3. Note that for s about 0.35 the distance between successive vectors is about n/4 and closeness is tenuous. Indeed, for arbitrary length vectors, if roughly one third of the bits are flipped (including duplications), then roughly one quarter of the bits will end up different. Conversely, for s=1/n (i.e., flip just one bit at each step) the vector sequence locally looks like thermometer code (with components shuffled), but once a bit is flipped twice the sequence will diverge from thermometer code. For example, with 100-bit vectors the probability is roughly one half that a subsequence of ten vectors will have a bit flipped twice. This reuse of bits permits a scatter code to provide much more capacity than a thermometer type code.

The first preferred embodiment provides a code with variance given by $$\sum_{r=0}^{f} p_f(r)(r - E[X_f])^2$$

where f and r are nonnegative integers, $X_f$ is a random variable which is the Hamming distance from the origin for an n-bit vector after f bit flips, $p_f(r)$ is the probability density of $X_f$, and E is the expectation operator. Thus the code variance is just the variance of the random variable $X_f$. That is, if a starting vector is at the origin of the unit n-dimensional hypercube (has all components equal to 0), and if f times a random bit is selected and flipped, then the resulting (random) vector is a Hamming distance $X_f$ from the origin. By symmetry this same analysis applies to the separation of any two vectors, not just vectors from the origin. The probability densities for the various f values are related by $$p_{f+1}(r) = p_f(r-1)\frac{n-r+1}{n} + p_f(r+1)\frac{r+1}{n}$$

and these relationships plus the initial conditions $p_0(0)=1$ and $p_0(r+1)=0$ determine the $p_f$'s recursively. Thus $$E[X_f] = \sum_{r=0}^{f} p_f(r)r = \frac{n}{2}\left(1 - \left(1 - \frac{2}{n}\right)^f\right)$$

Figure 4:
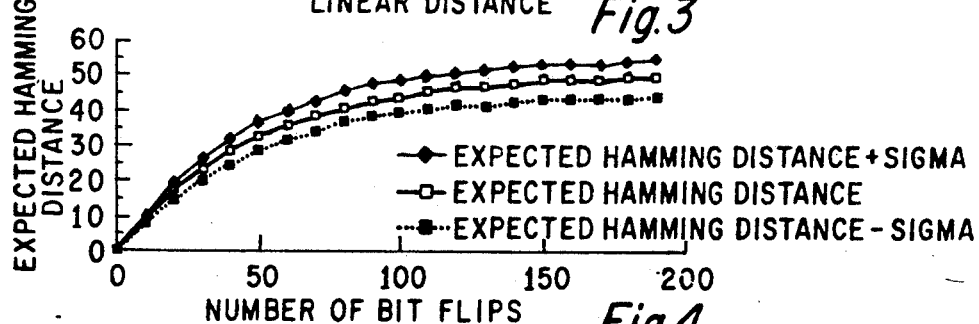
FIGS. 4–6 show statistical aspects of the preferred embodiments.

FIG. 4 illustrates $E[X_f]$ together with the plus and minus one standard deviation for various values of f with n=100.

Figure 5:
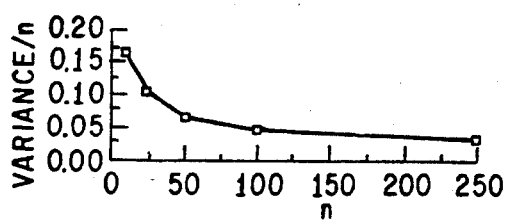

Further, FIG. 5 shows the ratio of the variance to n for various values of n with the first preferred embodiment (s=0.10). The variance is quite high when n is less than 50, so use of the scatter code will be useful only if the problem at hand can withstand such variance. With 100-bit or 256-bit vectors, as typically used with sparse distributed memories, the variance is down to 5% of n.

The capacity of the first preferred embodiment scatter code is determined by the allowable risk of two widely separated integers mapping to close (Hamming distance) vectors. In particular, if P is an acceptable probability for two n-bit image vectors being within a Hamming distance of hn with h a factor such as 0.25, then the capacity (number of vectors generated by flipping random groups of 0.1 n bits as previously described) is approximated by:

$$(2h^h)^{n/2}\sqrt{P/n}$$

Numerical evaluation of this capacity yields the following for various n and P:

| n | P | Capacity |
|---|---|---|
| 100 | $10^{-6}$ | 3500 |
| 200 | $10^{-9}$ | $10^9$ |
| 256 | $10^{-9}$ | $10^{13}$ |
| 256 | $10^{-12}$ | $10^{12}$ |

Thus the capacity of the scatter code is large compared to the capacity of codes such as thermometer code.

Note that the first preferred embodiment encoder could include a (pseudo)random number generator and generate a new encoding for each new computation required. Of course, any stored vectors in neural network 58 need to be compatibly encoded, and if neural network 58 stores vectors by learning (such as by back-propagation) then encoder 56 may conveniently generate the encoding lookup table prior to the network learning.

Figure 6:
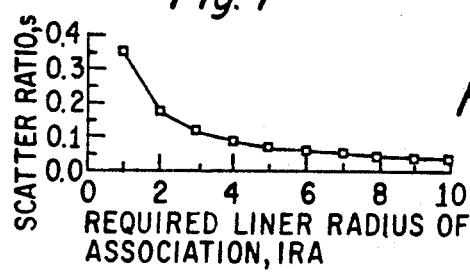

The second preferred embodiment method is similar to the first preferred embodiment method: a sequence of binary vectors is generated and the range of inputs is associated with the sequence to form a coding lookup table. The second preferred embodiment also generates the sequence of vectors by random bit flipping, but the fraction (denoted s) of bits flipped at each step to generate the sequence of coding vectors is varied from 0.1. In particular, s values of 0.05, 0.10, 0.20, and 0.30 are illustrated in FIG. 3 which shows the dependence of the expected Hamming distance between two image vectors as a function of the linear distance between the encoded integers. A decreasing fraction of bits flipped per step increases the integer radius of association for a given image Hamming radius of association; and using the typical n/4 Hamming radius of association measure, the linear radius of association increases as s decreases as illustrated in FIG. 6.

The third preferred embodiment is similar to the first and second preferred embodiments but has a varying s during the vector sequence generation. In particular, if the problem to be solved were the classification of noisy sensor information, and if it were known that the accuracy of the sensor was not constant over the range of operation, then the sequence generation could tuned to the sensor: s could be increased (decreasing the radius of association as shown in FIG. 6) in regions of high resolution sensor output and s decreased in region of low resolution output.

Similarly, if it is known that the data in one part of the input range comprises many data points with little noise, then the code for that range can have small linear step size and a low radius of association. Whereas if in other parts of the range there are few data points but a lot of noise, then the linear step size can be increased, and the radius of association will also be large.

Another modification of the preferred embodiments is a stop plus restart in the vector generation if the range of inputs is known ahead of time to be devoid of interesting data in certain intervals. Restarting the vector generation from a new random starting point at the next interesting part of the linear input space is permissible because the result of several (unused) steps in the vector generation is effectively independent of the starting point. The code can be fragmented many times in this manner; the only consequence will be the reduction of lookup table entries for the mapping between the linear input space and the binary vectors.

MODIFICATIONS AND ADVANTAGES

Various modifications in the preferred embodiment computation systems and methods may be made while retaining the feature of random recursive generation of code vectors.

For example, the bits selected for each flipping could be constrained to noncoincident, the number of bits selected could be randomly determined within a preset interval, the binary values could be $-1$ and 1 or other network-compatible values, complex numbers may be handled by separating the real and imaginary parts and mapping each separately and concatenating the vectors, the network may have neurons with three or more states so the corresponding code vector components have three or more values and the component changing ("bit flipping") would be to other possible values on either a probablistic or deterministic basis and with Hamming distance generalized to the sum of the magnitudes of the component differences, and so forth. The encoder could include a quantizer separate from any analog-to-digital converter or the encoder could include an analog-to-digital converter. And the systems could be used for various applications such as sensor interpretation, error correction, and other employing parallel computation by neural network type computers.

The invention provides closeness preserving encoding together with large capacity.

What is claimed is:

1. A method of processing information comprising:
   providing a set of information signals;
   receiving one of said set of information signals at an input of an encoder;
   generating a plurality of series of electrical signals in said encoder, each series associated with a corresponding one of said set of information signals, said generating step comprising the steps of:
      setting a selected number of said electrical signals in said series associated with the first information signal to a selected state; and
      for each of the remaining said series, setting said electrical signals to the states of the preceding series and then randomly changing a number of said electrical signals while maintaining the remaining electrical signals such that the Hamming distance between any two series is, within a selected probability, less than a selected value if the two corresponding information signals are within a given closeness;
   providing said electrical signals associated with said one of said set of information signals to an input of a neural network; and
   processing said electrical signals within said neural network.

2. The method of claim 1, wherein said generating step comprises generating a lookup table.

3. The method of claim 1, wherein said generating step comprises generating the contents of a memory.

4. The method of claim 1, wherein said step of providing a set of information signals comprises:
   viewing a physical image and creating an electrical signal with characteristics corresponding to the physical image;
   digitizing said electrical signal in an analog-to-digital converter; and
   performing a Fast Fourier Transform on said digitized electrical signal.

5. The method of claim 4, wherein said step of viewing a physical image comprises viewing a physical image through a television camera.

6. The method of claim 1, wherein said step of providing a set of information signals comprises providing sensor information and said step of processing said electrical signals within said neural network comprises classifying said sensor information.

7. The method of claim 1, wherein said step of generating a plurality of electrical signals comprises the step of generating two state electrical signals.

8. The method of claim 1, wherein said generating step is performed once and said steps of receiving, providing, and processing are performed more than once.

9. The method of claim 1, wherein said step of changing a number of said electrical signals comprises the step of changing the same number of electrical signals for each of said series.

10. The method of claim 1, wherein said Hamming distance is between the number one and thirty-five percent of the number of electrical signals.

11. The method of claim 1, wherein said Hamming distance is distributed with an average in the range between five percent of the number of electrical signals and twenty percent of the number of electrical signals.

* * * * *